United States Patent
Ostling et al.

(10) Patent No.: US 7,125,172 B2
(45) Date of Patent: Oct. 24, 2006

(54) WEATHERPROOF LOW FRICTION SPINDLE UNIT

(75) Inventors: Folke Ostling, Gothenburg (SE); Pierre Lavaine, Alingsas (SE)

(73) Assignee: Aktiebolaget SKF, Gothenburg (SE)

( * ) Notice: Subject to any disclaimer, the term of this patent is extended or adjusted under 35 U.S.C. 154(b) by 36 days.

(21) Appl. No.: 11/038,405

(22) Filed: Jan. 21, 2005

(65) Prior Publication Data

US 2005/0157967 A1    Jul. 21, 2005

(30) Foreign Application Priority Data

Jan. 20, 2004    (SE) .................................... 0400103

(51) Int. Cl.
*F16C 19/08*    (2006.01)

(52) U.S. Cl. ........................ 384/537; 384/518

(58) Field of Classification Search ................ 384/499, 384/504, 517, 518, 537, 539, 584, 585
See application file for complete search history.

(56) References Cited

U.S. PATENT DOCUMENTS 1,583,914 A * 5/1926 Buswell ..................... 384/537
3,639,019 A * 2/1972 Schaeffler ................... 384/537
4,131,245 A   12/1978 Noda et al.

FOREIGN PATENT DOCUMENTS

| EP | 1 228 687 A | 8/2002 |
| GB | 1 431 678 A | 4/1976 |
| JP | 2003 302418 A | 12/2003 |

* cited by examiner

*Primary Examiner*—Thomas R. Hannon
(74) *Attorney, Agent, or Firm*—Buchanan Ingersoll PC

(57) ABSTRACT

A spindle unit includes an elongated shaft, a tubular housing surrounding the shaft, a locating rolling bearing in the interior of the housing that is mounted on the shaft, and a non-locating rolling bearing provided in the interior of the housing and mounted on the shaft, wherein the two bearings are spaced apart along the shaft. The bearing housing is made as two identical halves, each of which is formed as a generally semi-tubular shell-formed member, having radii of varying size in the longitudinal direction thereof, with end portions closely adjoining to the shaft. Each bearing housing half is provided with an arrangement adapted to interconnect the two bearing housing halves in a weatherproof manner. The spindle unit can be incorporated into a fishing reel and a wind gauge.

20 Claims, 5 Drawing Sheets

WEATHERPROOF LOW FRICTION SPINDLE UNIT

This application is based on and claims priority under 35 U.S.C. § 119(a) with respect to Swedish Patent Application No. 0400103-9 filed on Jan. 20, 2004, the entire content of which is incorporated herein by reference

FIELD OF THE INVENTION

The present invention generally relates to a spindle unit. More particularly, the present invention relates to a weatherproof low friction spindle unit which can be incorporated in rotary systems requiring, for example, relatively high stability and low friction losses, including rotary systems operating under conditions where dirt, dust, water or other liquids frequently can splash over the spindle unit.

BACKGROUND DISCUSSION

Spindle units such as those described above can, by way of example, be used in hobby articles, toys and measuring instruments. Such spindle units can also be used for fishing reels to support the spool of the reel in a manner giving a reliable and smooth operation, while also being advantageous from noise aspects.

One example of a spindle unit is disclosed in SE-C2-518 489. This known spindle unit is a precision spindle unit for low friction performance which incorporates a tubular housing, preferably made of aluminum with an external anodic coating, which surrounds a shaft. A first locating rolling bearing is mounted on the shaft, and a fixed locking washer with a flange engages the inner race ring of the first rolling bearing to arrest this axially against a shoulder on the shaft. A second rolling bearing in the housing has a loose fit on the shaft, and a second locking washer is fitted to the shaft. A resilient member is provided between the second locking washer and the inner race ring of the second bearing and faces outwards. A shoulder projects inwardly in the housing, and against this shoulder the side of the inwardly directed outer race ring of the second rolling bearing engages. The second bearing by influence from the resilient member is biased between the resilient member and the first inwardly facing shoulder in the housing, the locking washers to define a slot seal at each axial side of the housing, whereby each one of the first and the second rolling bearings, at their outwardly facing sides are provided with an integral labyrinth seal.

The main purpose of this known spindle unit is to provide a precision spindle unit having very good running properties. Although the spindle unit achieved this result, the spindle unit was so expensive to manufacture that it could be used only in applications where a very high demand for low friction properties exists.

SUMMARY

The new spindle unit disclosed here provides a weatherproof low friction spindle unit having relatively high quality performance, while not being excessively expensive to manufacture.

According to one aspect, a spindle unit comprises an elongated shaft, a tubular bearing housing surrounding the shaft and possessing an inner diameter greater than an outer diameter of the shaft, a locating rolling bearing positioned in the interior of the tubular bearing housing and mounted on the shaft, and a non-locating rolling bearing positioned in the interior of the bearing housing and mounted on the shaft, with the locating rolling bearing and the non-locating rolling bearing being spaced apart along the shaft. The bearing housing is comprised of two identical bearing housing halves, each formed as a semi-tubular shell-formed member having radii of varying size in the longitudinal direction thereof, with end portions closely adjoining the shaft. Each of the bearing housing halves includes means for interconnecting the two bearing housing halves in a centered and substantially weatherproof manner.

According to another aspect, a spindle unit comprises an elongated shaft having an intermediate portion, a tubular bearing housing surrounding at least the intermediate portion of the shaft, a first rolling bearing positioned inside the bearing housing and mounted on the shaft, and a second rolling bearing positioned inside the housing and mounted on the shaft, with the first and second rolling bearings being axially spaced apart along the shaft. The bearing housing is comprised of first and second identical bearing housing halves each comprised of a shell member possessing end portions that adjoin the shaft. The first and second bearing housing halves each possess side edges extending between the end portions of the respective bearing housing halves. The side edges of the first and second bearing housing halves are provided with interfitting elements so that the interfitting element on one side edge of the first bearing housing half interfits with the interfitting element on one side edge of the second bearing housing half while the interfitting element on the other side edge of the first bearing housing half interfits with the interfitting element on the other side edge of the second bearing housing half to connect together the two bearing housing halves.

BRIEF DESCRIPTION OF THE DRAWING FIGURES

The foregoing and additional features and characteristics of the disclosed spindle unit will become more apparent from the following detailed description considered with reference to the accompanying drawing figures in which like reference numerals identify like features.

DETAILED DESCRIPTION

Figure 1:
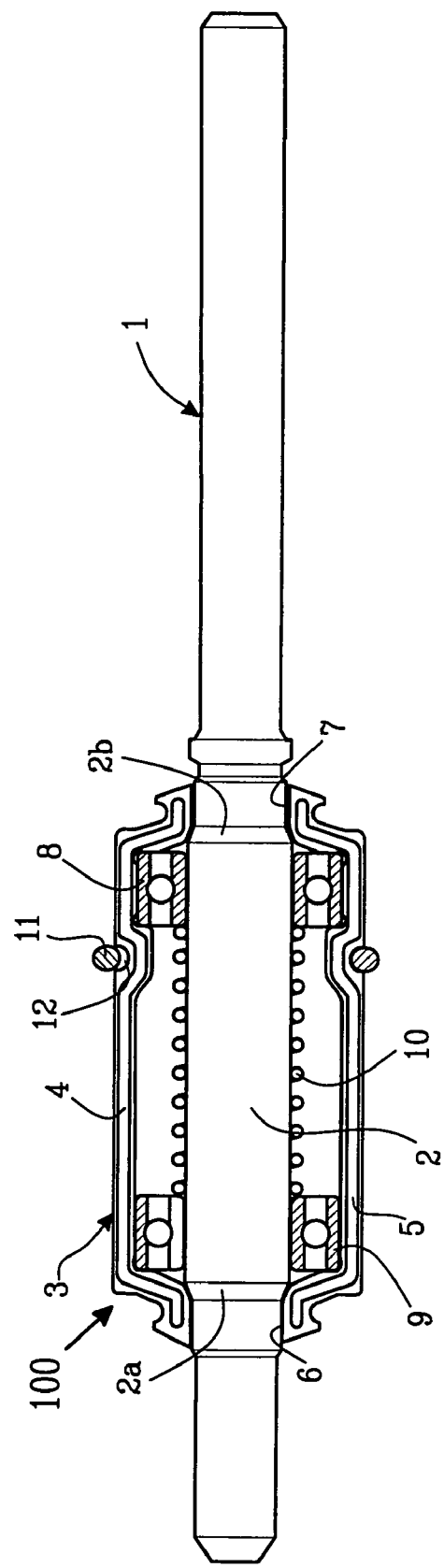
FIG. 1 is a side view, partially in section, of the new spindle unit disclosed here.

FIG. 1 illustrates the new spindle unit 100 which can serve as a weatherproof low friction spindle unit. The unit includes an elongated shaft 1 having opposite ends and an intermediate portion 2 of larger diameter provided between the two ends of the shaft. The ends of the larger diameter intermediate portion possess sloping annular end surfaces 2a, 2b, connecting the intermediate portion 2 with the rest of the shaft. A bearing housing 3 encloses, surrounds or encircles a portion of the shaft 1. More specifically, the bearing housing 3 encloses, surrounds or encircles the intermediate portion 2 of the shaft as well as the sloping annular end surfaces 2a, 2b of the shaft 2.

Figure 5:
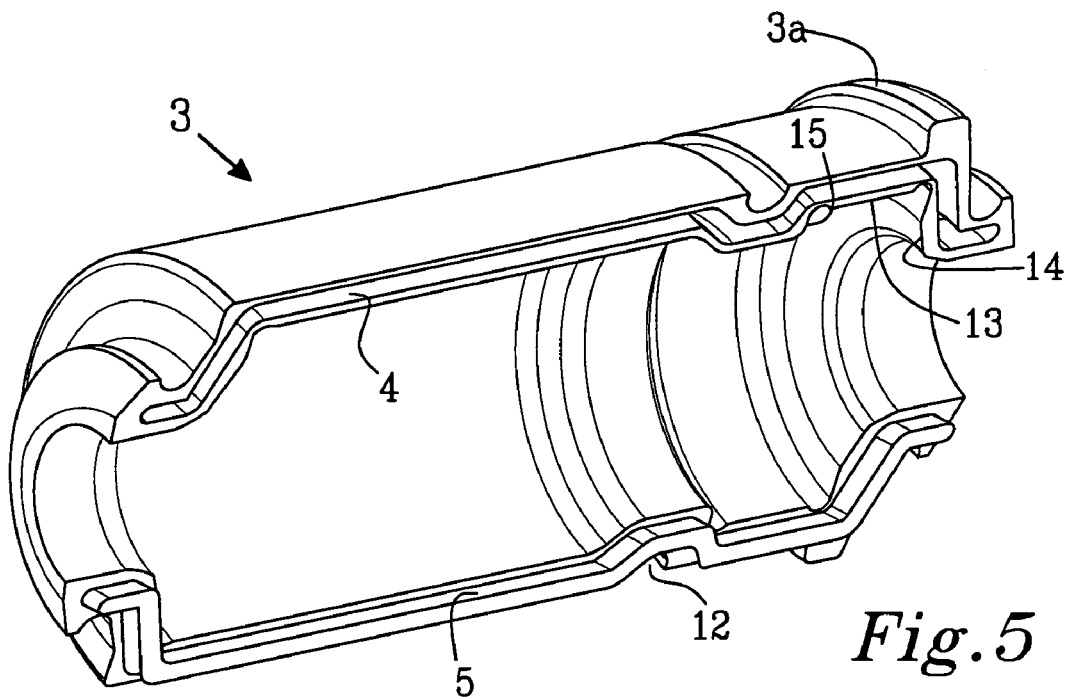
FIG. 5 is a perspective view of half of a housing for the spindle unit disclosed here.

The disclosed embodiment of the bearing housing 3 is made in two identical halves, only one of which is shown in FIG. 1. Each half of the bearing housing is in the form of a semicircular tubular shell or semi-tubular shell-formed member. Each bearing housing half is configured so that the halves each have radii of varying size in the longitudinal direction thereof. Each shell is provided with an arrangement for interconnecting, centering and locking the two bearing housing halves together in a substantially water tight manner to form the bearing housing 3. This arrangement can be in the form of interfitting elements which interfit with one another to interconnect the bearing housing halves. The interfitting elements can take a variety of forms. FIG. 5 illustrates one form of the interfitting elements 4, 5. This illustrated example of the arrangement which interconnects, centers and locks the two bearing housing halves together will be described in more detail below.

With the two-part construction of the bearing housing 3, it is possible to let the bearing housing itself have axial end portions 6, 7 closely adjoining the sloping end surfaces 2a, 2b of the intermediate portion 2 of the shaft 1 and the shaft surface axially outside the intermediate portion 2. The bearing housing halves are also provided with bearing seats for receiving a locating bearing 8 and a non-locating bearing 9 which are mounted in axially spaced apart relation on the intermediate portion 2 of the shaft. The non-locating bearing 9 is biased in an axial direction away from the locating bearing 8 by way of a resilient member 10. In the illustrated embodiment, the biasing member is a spring positioned around the intermediate portion 2 of the shaft and acting between the inner race rings of the two bearings 8, 9.

When assembling this spindle unit 100, one of the housing halves 3 (a first housing half) is first positioned with its opening facing upwards, and a shaft 1 with the bearings 8, 9 and the spring 10 positioned on the intermediate portion 2 is lowered down into the first housing half, whereby it is ascertained that the bearings 8, 9 are positioned in their respective bearing seats. Sealing rings or the like can also be positioned around the shaft, although the very thin slit between the shaft 1 and the inner wall of the bearing housing halves will form a labyrinth which in most cases will form a labyrinth seal giving sufficient sealing effect.

When the shaft has been positioned in the first bearing housing half 3, the other bearing housing half (second bearing housing half) is positioned thereover, with the interconnecting or cooperating arrangement 4, 5 of the housing halves engaging each other. The two housing halves are thereupon secured to each other or against each other by way of a suitable connection mechanism such as a connecting member 11 or glue. As the spindle unit in question is generally intended for rather modest loads, and most often is mounted in a housing enclosing and locking the spindle halves, the connecting member can preferably be in the form of an elastic O-ring member 11, as illustrated, which is positioned in a groove 12 formed in the outer peripheral surface of the bearing housing halves.

The spindle unit 100 can be manufactured and delivered to the end user as a closed sealed off unit in which the shaft is encapsulated in the bearing housing 3.

Figure 2:
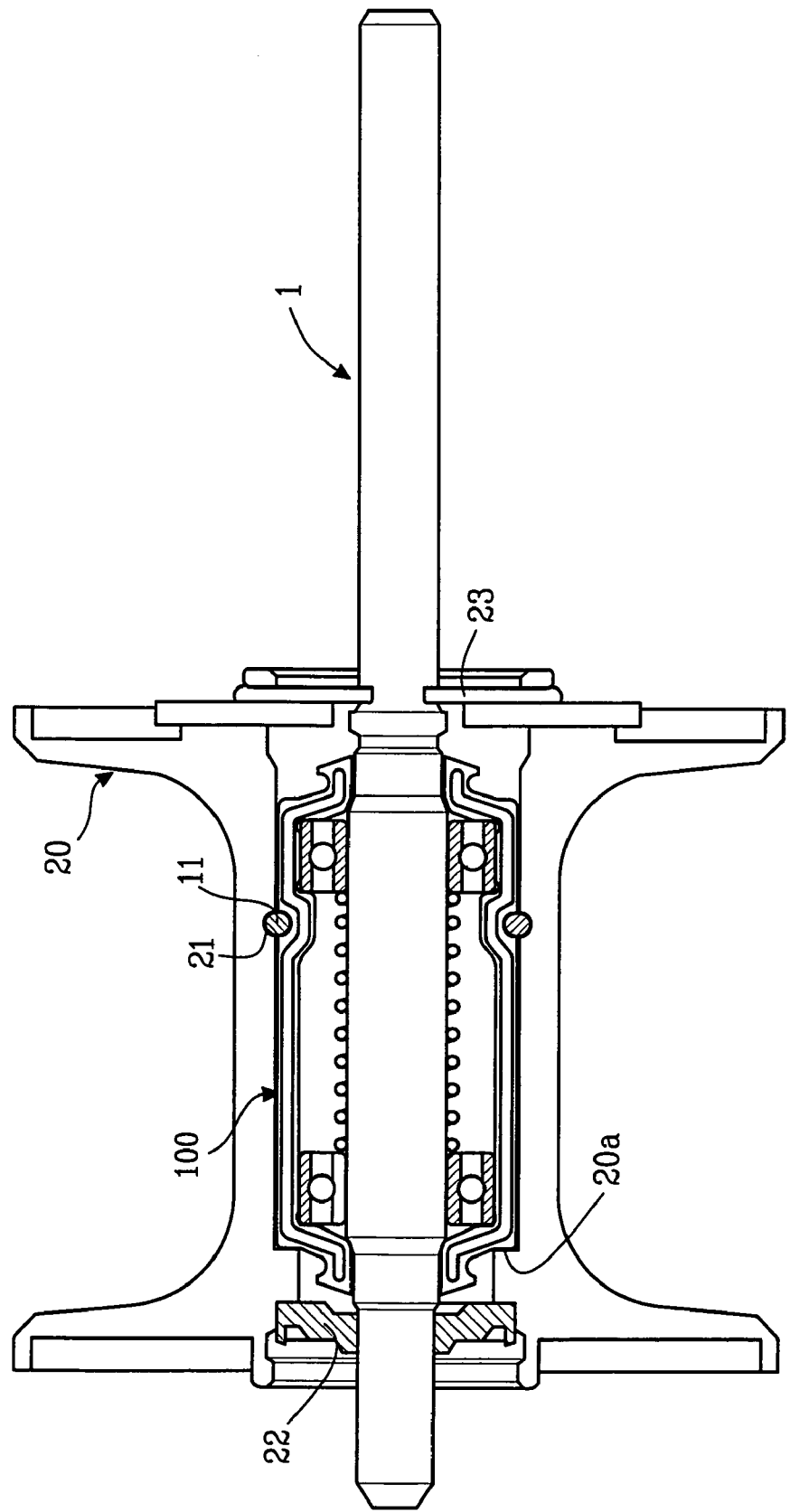
FIG. 2 is a side view, partially in section, of the spindle unit illustrated in FIG. 1 showing the spindle unit used in connection with a fishing reel which is shown in section in a simplified form.

As illustrated in FIG. 2, one use for the disclosed spindle unit 100 is in connection with a fishing reel. The spindle unit 100 can be inserted from the left hand side in the FIG. 2 illustration, axially in the interior of the reel housing 20, where it can be moved to the correct position with the aid of the interconnecting member 11 which, as described, can be in the form of an O-ring that keeps the housing halves together. The interconnecting member 11 can be positioned in a circumferential groove 21 in the interior of the reel housing 20 as shown in FIG. 2. The spindle unit 100 is axially secured in position in the reel housing 20 between a shoulder 20a in the interior of the reel housing and the interconnecting member 11. In addition, a lid 22 and a locking ring 23 are positioned at opposite axial ends of the reel housing 20.

Figure 3:
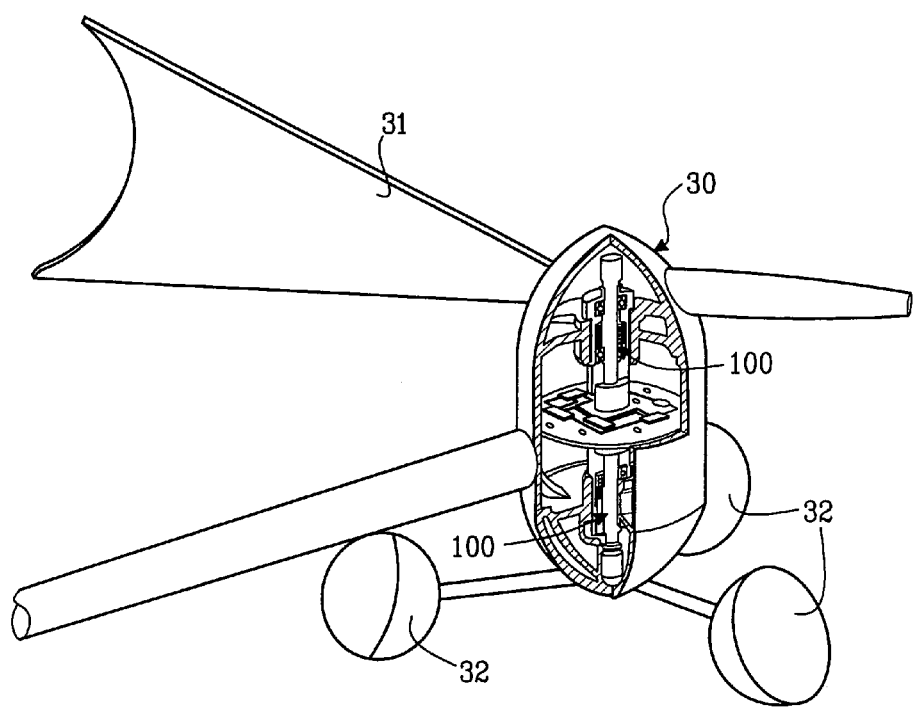
FIG. 3 illustrates a portion of a wind measuring instrument incorporating two of the spindle units disclosed here, with a portion of the outer casing of the wind measuring instrument removed.

FIG. 3 schematically illustrates another possible application for the new spindle unit 100 disclosed here, namely a wind measuring instrument or wind gauge. In this case, two such spindle units 100 are used, and the wind gauge includes a tubular housing 30. The action of the wind on a wind vane 31 will turn the wind gauge housing 30 to indicate the direction of the wind via a position sensor associated with one of the spindle units 100. The other spindle unit 100 is associated with a wind impeller 32 which, via a speed sensing member associated with the second spindle unit, indicates the current wind speed.

Figure 4:
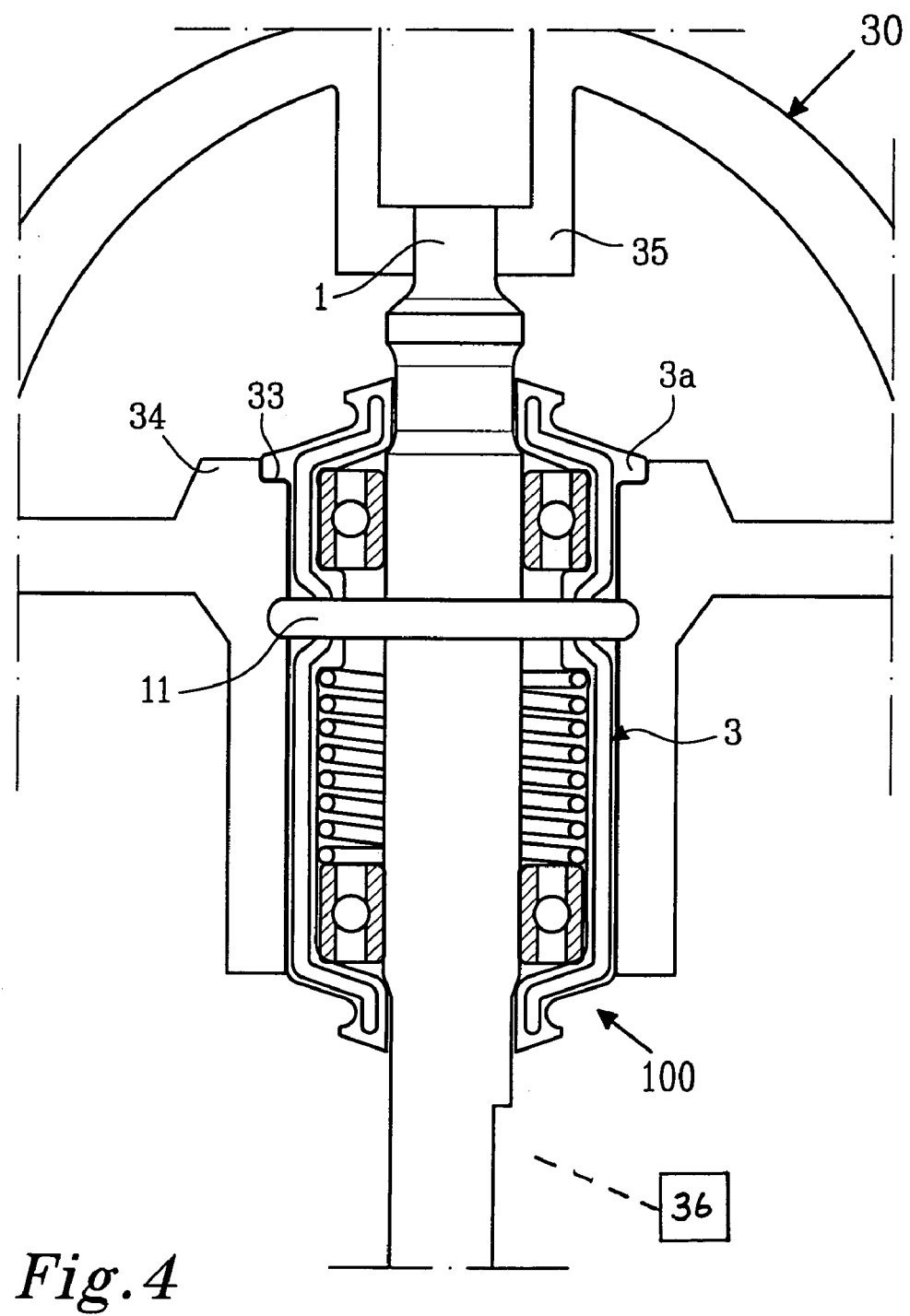
FIG. 4 is an enlarged perspective schematic view of a part of the wind measuring instrument shown in FIG. 3, with portions of the instrument casing and the spindle unit housing removed.

FIG. 4 illustrates an upper portion of a wind gauge which incorporates the new spindle unit 100 having substantially the same construction as that shown in FIG. 1. The major difference as compared to the earlier illustrated embodiment is that the bearing housing 3 at one axial end has an external circumferential bulb 3a adapted to fit into a corresponding recess 33 in a central hub structure 34 in the wind gauge housing 30. The spindle is thus axially arrested between this recess and the interconnecting member 11. The shaft 1 projecting out from the bearing housing 3 is arranged to cooperate with a wind direction indicator 35 in the wind gauge housing 30 to establish indications representative for the wind direction. A sensor (schematically illustrated in FIG. 4 at 36) can be positioned within the gauge housing for producing electric signals representative for the wind speed. These signals can be transferred or transmitted to external processing and/or recording means.

FIG. 5 shows in perspective view one of the bearing housing halves 3 shown in FIG. 4 (i.e., with an external, circumferential bulb 3a adjacent one axial end). Except for this additional bulb, the mainly tubular bearing housing half 3 is similar to that illustrated in FIGS. 1 and 2, and so a detailed description of the previously described features of the housing halves is not repeated here.

As shown in FIG. 5, the shell-formed wall of the housing half 3 has, at one axial end, a portion 13 bordered by the wall portions 14, 15 of smaller diameter. This portion 13 forms a seat for the locating bearing 8 (shown in FIG. 1). FIG. 5 also illustrates one possible form of the arrangement provided on the bearing housing halves for interconnecting, centering and locking together the bearing housing halves. In the illustrated embodiment, the arrangement is in the form of interfitting elements in which one of the longitudinal side edges of each bearing housing half 3 has a groove 4, whereas the opposite side edge has a corresponding projecting ridge 5. The groove 4 and the ridge 5 function as the interconnecting arrangement which interconnects the bearing housing halves 3 in a manner making it possible to ascertain that the halves are centered and to prevent the passage of dirt, dust or moisture therethrough.

Figure 6:
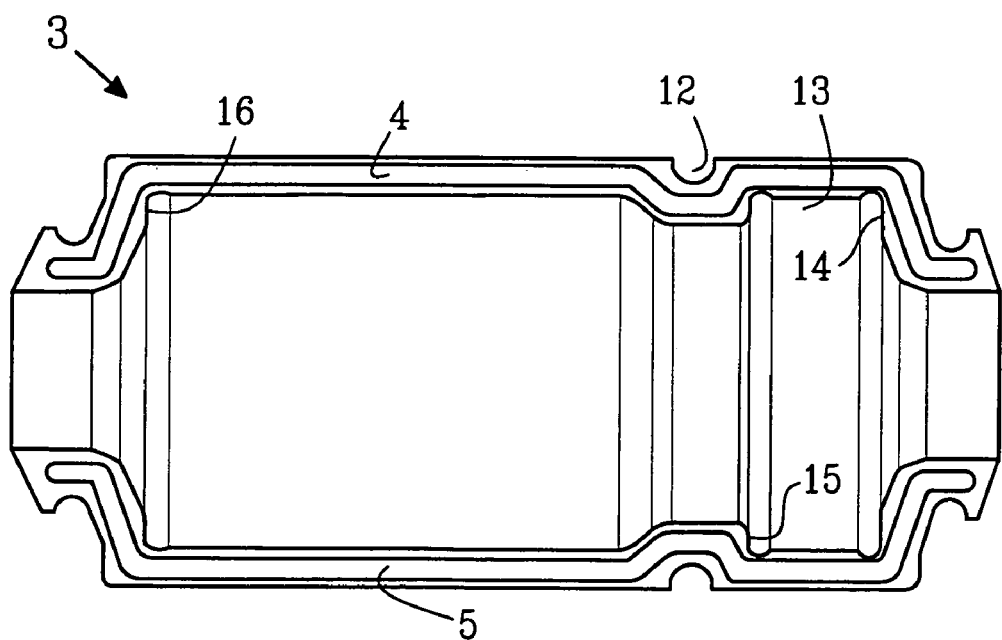
FIG. 6 is an enlarged planar view of the housing half shown in FIG. 5.

FIG. 6 shows the bearing housing half 3 illustrated in FIG. 1. The bearing housing half shown in FIG. 6 differs from the bearing housing half illustrated in FIG. 5 in that the housing half 3 shown in FIG. 6 does not include the external circumferential bulb.

As can be seen from FIG. 5, the groove 4 and the ridge 5, follow the somewhat winding or varying outer contour of the housing side edges so that the grove 4 and the ridge 5 are offset from a linear direction (i.e., the groove and the ridge are not configured along a straight line). It is thus possible to make sure that the two parts of the bearing housing 3 will be positioned in exactly correct mutual positions when they are put together. The form of the groove 4 and ridge 5 being complementary to each other also helps provide a tight joint between the housing halves, and so the risk of leakage of dirt, dust and moisture into the spindle unit 100 is reduced or substantially eliminated.

FIG. 6 illustrates the restriction of the bearing seat 13 for the locating bearing 8 (FIG. 1) by the depending wall portions 14 and 15 of the housing wall. The non-locating bearing 9 (FIG. 1) will engage a depending wall portion 16 of the bearing housing at the opposite axial end of the housing and will be urged against this wall portion under the influence of the resilient force exerted by the biasing member 10 shown in FIG. 1.

The actual design or configuration of the outer peripheral surface of the bearing housing of course is to be adapted to the purpose for which the spindle unit is intended. In the embodiments illustrated and described, the different embodiments of the spindle unit 100 are substantially similar, but it is evident that the exterior of the spindle unit can be altered to be appropriate for different applications.

The bearing housing halves 3 are preferably manufactured from appropriate plastic materials, preferably by injection molding, although other appropriate manufacturing techniques are also possible.

The different applications of the invention have been shown with deep groove ball bearings, but it should be understood that other types of bearings can be used.

Although the arrangement for interconnecting the bearing housing halves has been shown and described as a groove and tongue joint, it is also possible that the centering and locking of the bearing housing halves can be produced with pins and corresponding bores, although the weather-proof performance may be somewhat lower with such an alternative solution.

The principles and preferred embodiments have been described in the foregoing specification. However, the invention that is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A spindle unit comprising:
   an elongated shaft;
   a tubular bearing housing comprising an interior, the tubular bearing housing surrounding the shaft and possessing an inner diameter greater than an outer diameter of the shaft;
   a locating rolling bearing positioned in the interior of the tubular bearing housing and mounted on the shaft;
   a non-locating rolling bearing positioned in the interior of the bearing housing and mounted on the shaft;
   the locating rolling bearing and the non-locating rolling bearing being spaced apart along the shaft;
   the bearing housing being comprised of two identical bearing housing halves, each formed as a semi-tubular shell-formed member having radii of varying size in the longitudinal direction thereof, with end portions closely adjoining the shaft, each half comprising means for interconnecting the two bearing housing halves in a centered and substantially weatherproof manner.

2. The spindle unit according to claim 1, wherein the locating bearing is held in position in the bearing housing in a bearing seat formed between first and second depending wall portions in the interior of the housing.

3. The spindle unit according to claim 2, wherein the non-locating bearing is arranged against a third depending wall portion in the bearing housing, and comprising means for biasing the non-locating bearing against the third depending wall portion.

4. The spindle unit according to claim 3, wherein each of the two halves of the bearing housing has longitudinal side edges and a contour, the means for interconnecting comprising one of the side edges being provided with a groove following the contour of the bearing housing half and the other side edge being provided with a projecting ridge following the contour of the bearing housing half, said groove and said ridge being complementary to each other so that the ridge on one half fits into the groove on the other half.

5. The spindle unit according to claim 4, comprising a resilient connecting member extending around an outer peripheral surface of the bearing housing and positioned in a groove provided at the outer peripheral surface of the bearing housing to hold together the two bearing housing halves in an assembled state.

6. A spindle unit according to claim 5, wherein the two bearing housing halves are injection molded plastic material members.

7. The spindle unit according to claim 6, wherein the shaft possesses an intermediate portion and an annular sloping end face at each end of the intermediate portion, the intermediate portion possessing an outer diameter greater than the outer diameter of a remainder of the shaft, the annular sloping end faces being spaced apart from each other and positioned adjacent the end portions to form together with inner surfaces of the halves of the bearing housing outside labyrinth-shaped sealing arrangements.

8. The spindle unit according to claim 1, wherein each of the two halves of the bearing housing has longitudinal side edges and a contour, the means for interconnecting comprising one of the side edges being provided with a groove following the contour of the bearing housing half and the other side edge being provided with a projecting ridge following the contour of the bearing housing half, said groove and said ridge being complementary to each other so that the ridge on one half fits into the groove on the other half.

9. The spindle unit according to claim 1, comprising a resilient connecting member extending around an outer peripheral surface of the bearing housing and positioned in a groove provided at the outer peripheral surface of the bearing housing to hold together the two bearing housing halves in an assembled state.

10. The spindle unit according to claim 1, wherein the spindle unit is positioned in a reel housing of a fishing reel, with a locking member received in a groove provided at an exterior of the bearing housing and in a groove provided at an interior of the reel housing.

11. The spindle unit according to claim 1, wherein the spindle unit is positioned in a wind gauge housing of a wind gauge, said spindle unit being operatively connected to at least one of a sensor means for establishing wind speed and a wind direction indicator establishing wind direction.

12. A spindle unit comprising:
an elongated shaft having an intermediate portion;
a tubular bearing housing surrounding at least the intermediate portion of the shaft;
a first rolling bearing positioned inside the bearing housing and mounted on the shaft;
a second rolling bearing positioned inside the housing and mounted on the shaft;
the first and second rolling bearings being axially spaced apart along the shaft;
the bearing housing being comprised of first and second identical bearing housing halves each comprised of a shell member possessing end portions that adjoin the shaft;
the first and second bearing housing halves each possessing side edges extending between the end portions of the respective bearing housing halves, the side edges of the first and second bearing housing halves being provided with interfitting elements so that the interfitting element on one side edge of the first bearing housing half interfits with the interfitting element on one side edge of the second bearing housing half while the interfitting element on the other side edge of the first bearing housing half interfits with the interfitting element on the other side edge of the second bearing housing half to connect together the two bearing housing halves.

13. The spindle unit according to claim 12, wherein the first bearing is held in position in the bearing housing in a bearing seat formed between first and second depending wall portions inside the bearing housing.

14. The spindle unit according to claim 12, wherein the second bearing is arranged against a depending wall portion in the bearing housing, the second bearing being urged against the depending wall portion by a spring.

15. The spindle unit according to claim 12, wherein the interfitting members comprise a groove and a ridge, with the ridge fitting into the groove, the groove and the ridge being configured to follow a contour of the respective bearing housing halves.

16. The spindle unit according to claim 12, wherein an outer peripheral surface of the bearing housing is provided with a groove, and comprising a resilient connecting member extending around the outer peripheral surface of the bearing housing and positioned in the groove to hold together the first and second bearing housing halves.

17. The spindle unit according to claim 12, wherein the first and second bearing housing halves are injection molded plastic material members.

18. The spindle unit according to claim 12, wherein the shaft possesses an intermediate portion and an annular sloping end face at each end of the intermediate portion, the intermediate portion possessing an outer diameter greater than the outer diameter of a remainder of the shaft, the annular sloping end faces being spaced apart from each other and positioned adjacent the end portions to form together with inner surfaces of the halves of the bearing housing outside labyrinth-shaped sealing arrangements.

19. The spindle unit according to claim 12, wherein the spindle unit is positioned in a reel housing of a fishing reel, with a locking member received in a groove provided at an exterior of the bearing housing and in a groove provided at an interior of the reel housing.

20. The spindle unit according to claim 12, wherein the spindle unit is positioned in a wind gauge housing of a wind gauge, said spindle unit being operatively connected to at least one of a sensor means for establishing wind speed and a wind direction indicator establishing wind direction.

* * * * *

UNITED STATES PATENT AND TRADEMARK OFFICE
CERTIFICATE OF CORRECTION

PATENT NO.        : 7,125,172 B2                                              Page 1 of 1
APPLICATION NO.   : 11/038405
DATED             : October 24, 2006
INVENTOR(S)       : Folke Ostling et al.

It is certified that error appears in the above-identified patent and that said Letters Patent is hereby corrected as shown below:

On the title page:
At (73) Assignee, change "Gothenburg" to --Göteborg--.

Signed and Sealed this

Twenty-sixth Day of June, 2007

JON W. DUDAS
*Director of the United States Patent and Trademark Office*